(12) United States Patent
Lin et al.

(10) Patent No.: US 12,122,519 B2
(45) Date of Patent: Oct. 22, 2024

(54) PRIVATE SUITE FOR ECONOMY CABIN SPACE IN AIRCRAFT

(71) Applicant: B/E Aerospace, Inc., Winston-Salem, NC (US)

(72) Inventors: Horng Lin, Winston-Salem, NC (US); Travis Finlay, Winston-Salem, NC (US); Glenn A. Johnson, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 58 days.

(21) Appl. No.: 17/338,989

(22) Filed: Jun. 4, 2021

(65) Prior Publication Data
US 2021/0380255 A1 Dec. 9, 2021

Related U.S. Application Data

(60) Provisional application No. 63/035,442, filed on Jun. 5, 2020.

(51) Int. Cl.
*B64D 11/06* (2006.01)
(52) U.S. Cl.
CPC ...... *B64D 11/0602* (2014.12); *B64D 11/0606* (2014.12); *B64D 11/0638* (2014.12); *B64D 11/0647* (2014.12)
(58) Field of Classification Search
CPC ............ B64D 11/0606; B64D 11/0638; B64D 11/0647; B64D 11/0604; B60N 2/22; B60N 2/64
See application file for complete search history.

(56) References Cited

U.S. PATENT DOCUMENTS

| | | | |
|---|---|---|---|
| 6,170,786 B1 | 1/2001 | Park et al. | |
| 6,276,635 B1 * | 8/2001 | Ferry | B64D 11/0604 244/122 R |
| 7,975,962 B2 * | 7/2011 | Jacob | B64D 11/0636 244/118.6 |
| 8,167,244 B2 * | 5/2012 | Johnson | B64D 11/00151 105/344 |
| 8,177,165 B2 | 5/2012 | Bettell | |
| 8,740,144 B2 | 6/2014 | Goehlich et al. | |

(Continued)

FOREIGN PATENT DOCUMENTS

WO  2020039236 A1  2/2020

OTHER PUBLICATIONS

Extended Search Report for European Application No. 21178059.8 dated Oct. 21, 2021, 7 pages.

*Primary Examiner* — Christopher D Hutchens
(74) *Attorney, Agent, or Firm* — Suiter Swantz IP

(57) ABSTRACT

An economy class (Y class) private suite includes a continuous seatback and a stowable aisle-side panel. The continuous seatback covers the gaps between seats of a 3-seat or 4-seat PAX and the stowable aisle-side panel slides to close off the PAX from the aisle when desirable. Each seat in the PAX includes an extension element to extend from the anterior surface of the seat cushion and establish a substantially flat surface including the seat cushions and extension elements. A separate padded element may be placed over the substantially flat surface. Each seatback cushion in the PAX is removable and reconfigurable as a reclining support or expanded armrest.

9 Claims, 10 Drawing Sheets

(56) References Cited

U.S. PATENT DOCUMENTS

| | | | |
|---|---|---|---|
| 9,027,880 B2 | 5/2015 | Breuer et al. | |
| 9,650,145 B2 | 5/2017 | Lambert | |
| 9,868,528 B2 | 1/2018 | Mayer | |
| 2002/0125758 A1* | 9/2002 | Duncan | B60N 2/643 |
| | | | 297/452.41 |
| 2009/0200422 A1* | 8/2009 | Johnson | B64D 11/0601 |
| | | | 244/118.5 |
| 2009/0224103 A1* | 9/2009 | Neumann | B64D 11/0023 |
| | | | 244/129.1 |
| 2012/0200125 A1 | 8/2012 | Achilles | |
| 2013/0054279 A1* | 2/2013 | Sharp | G06Q 10/06 |
| | | | 705/5 |
| 2013/0320139 A1* | 12/2013 | Cho | B64D 11/0636 |
| | | | 244/118.6 |
| 2014/0014774 A1 | 1/2014 | Pozzi et al. | |
| 2015/0166183 A1 | 6/2015 | Henshaw | |
| 2016/0297524 A1* | 10/2016 | Simeon | B64D 11/0601 |
| 2016/0312920 A1* | 10/2016 | Ruppin | F16L 3/1075 |
| 2017/0088267 A1 | 3/2017 | Dowty et al. | |
| 2017/0283065 A1 | 10/2017 | Papke et al. | |
| 2018/0079508 A1* | 3/2018 | Carlioz | B64D 11/0604 |
| 2018/0125244 A1* | 5/2018 | Johnson | B64D 11/0647 |
| 2018/0281964 A1* | 10/2018 | Carlioz | B64D 11/0601 |
| 2019/0202565 A1 | 7/2019 | Cornell | |
| 2019/0322371 A1 | 10/2019 | Dowty et al. | |
| 2019/0382131 A1* | 12/2019 | Johannessen | G09F 13/22 |

* cited by examiner

PRIVATE SUITE FOR ECONOMY CABIN SPACE IN AIRCRAFT

PRIORITY

The present application claims the benefit under 35 U.S.C. § 119(e) of U.S. Provisional App. No. 63/035,442 (filed Jun. 5, 2020), which is incorporated herein by reference.

BACKGROUND

In state-of-the-art aircraft, there is often little or no privacy for passengers in economy-class seats; nor any option for increased privacy. Families, especially those traveling with small children, may be under increased stress from limited space and social pressure not to disturb surrounding passengers. Furthermore, during periods of increased risk of communicable infections, it may be desirable for certain economy class passengers to segregate their family units from other economy class passengers.

SUMMARY

In one aspect, embodiments of the inventive concepts disclosed herein are directed to an economy class (Y class) private suite having a continuous seatback and a stowable aisle-side panel. The continuous seatback covers the gaps between seats of a 3-seat or 4-seat passenger seating unit (PAX) and the stowable aisle-side panel slides to close off the PAX from the aisle when desirable.

In a further aspect, each seat in the PAX includes an extension element to extend from the anterior surface of the seat cushion and establish a substantially flat surface including the seat cushions and extension elements. A separate padded element may be placed over the substantially flat surface.

In a further aspect, each seatback cushion in the PAX is removable. The removable seatback cushions are reconfigurable as a reclining support or expanded armrest.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
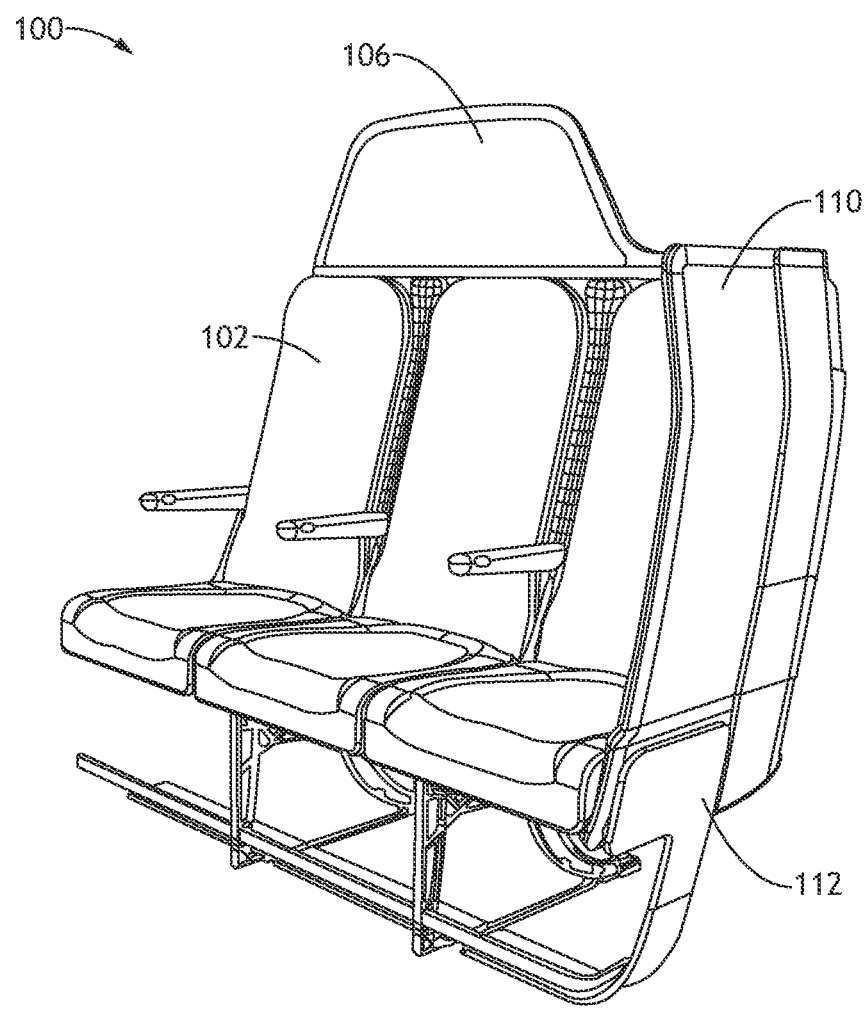
FIG. 1A shows a perspective view of an aircraft suite according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an economy class private suite having a continuous seatback and a stowable aisle-side panel. The continuous seatback covers the gaps between seats of a 3-seat or 4-seat PAX and the stowable aisle-side panel slides to close off the PAX from the aisle when desirable.

Figure 1B:
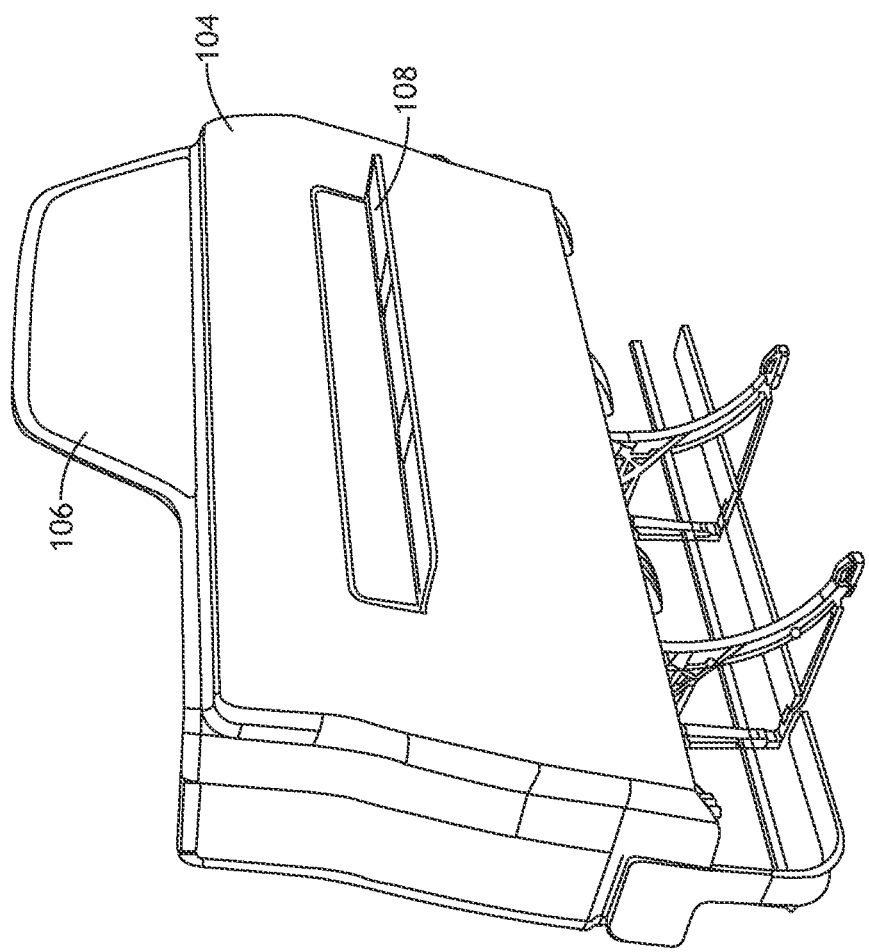
FIG. 1B shows a perspective view of an aircraft suite according to an exemplary embodiment.

Referring to FIGS. 1A-1B, perspective views of an aircraft suite 100 according to an exemplary embodiment are shown. The aircraft suite 100 comprises a 3-seat or 4-seat PAX 102, either specifically built or retrofitted to include a continuous seatback panel 104. The continuous seatback panel 104 is affixed or configured to be affixed to each aircraft seat in the PAX 102, and covers any gaps between the seats that generally correspond to armrests.

In at least one embodiment, the continuous seatback panel 104 includes an extension portion 106 that extends from a top portion of the continuous seatback panel 104. The extension portion 106 may extend upward to be proximal to an overhead bin or passenger service module. In at least one embodiment, the extension portion 106 may extend laterally, less than the entire length of the continuous seatback panel 104; in such embodiments, the extension portion 106 may be disposed proximal to an edge of the continuous seatback panel 104, and generally conforming to the shape of an internal surface of the aircraft. In at least one embodiment, the extension portion 106 comprises a material suitable as a projector screen for entertainment. Alternatively, or in addition, the extension portion 106 may comprise a soft material to muffle sound. In such embodiment, the extension portion 106 may comprise a rigid or semi-rigid frame to receive and support the material; the material may be removable for cleaning and servicing. In at least one embodiment, LED lights may be woven into the extension portion 106 for room light or décor, or as a signaling element for crew members.

In at least one embodiment, the continuous seatback panel 104 comprises a deployable tray table 108, useable by passengers in the PAX behind the aircraft suite 100. In at least one embodiment, the deployable tray table 108 is a continuous element that supplants individual tray tables. Alternatively, the deployable tray table 108 may comprise separately deployable tray table elements that are configured to interlock when adjacent tray table elements are deployed together.

The aircraft suite 100 comprises a stowable aisle-side panel 110. The stowable aisle-side panel 110 may be in an open configuration, allowing passengers and crew to enter the aircraft suite 100, or a closed configuration, where the interior of the aircraft suite 100 is substantially shielded from view. In at least one embodiment, an anterior edge of the stowable aisle-side panel 110 may generally conform to the shape of the seatback in front of the aircraft suite 100.

In at least one embodiment, the stowable aisle-side panel 110 may be configured to slide upon a track or rail. Such track or rail may define positive stops to maintain the stowable aisle-side panel 110 in either the open configuration or the closed configuration. Furthermore, one or more lateral panels 112 may define the range of motion of the stowable aisle-side panel 110, or otherwise maintain the stowable aisle-side panel 110 in position.

In at least one embodiment, the aircraft suite 100 is integrated with the corresponding passenger service module, either via the extension portion 106 of the continuous seatback panel 104 or a separate panel of integration element (not shown). Integration with the passenger service module allows the aircraft suite 100 to include alternative airflow outlets and air filtration elements. Such alternative airflow outlets and air filtration elements may be disposed within or defined by the continuous seatback panel 104 and/or fixed aisle-side panels.

Figure 2A:
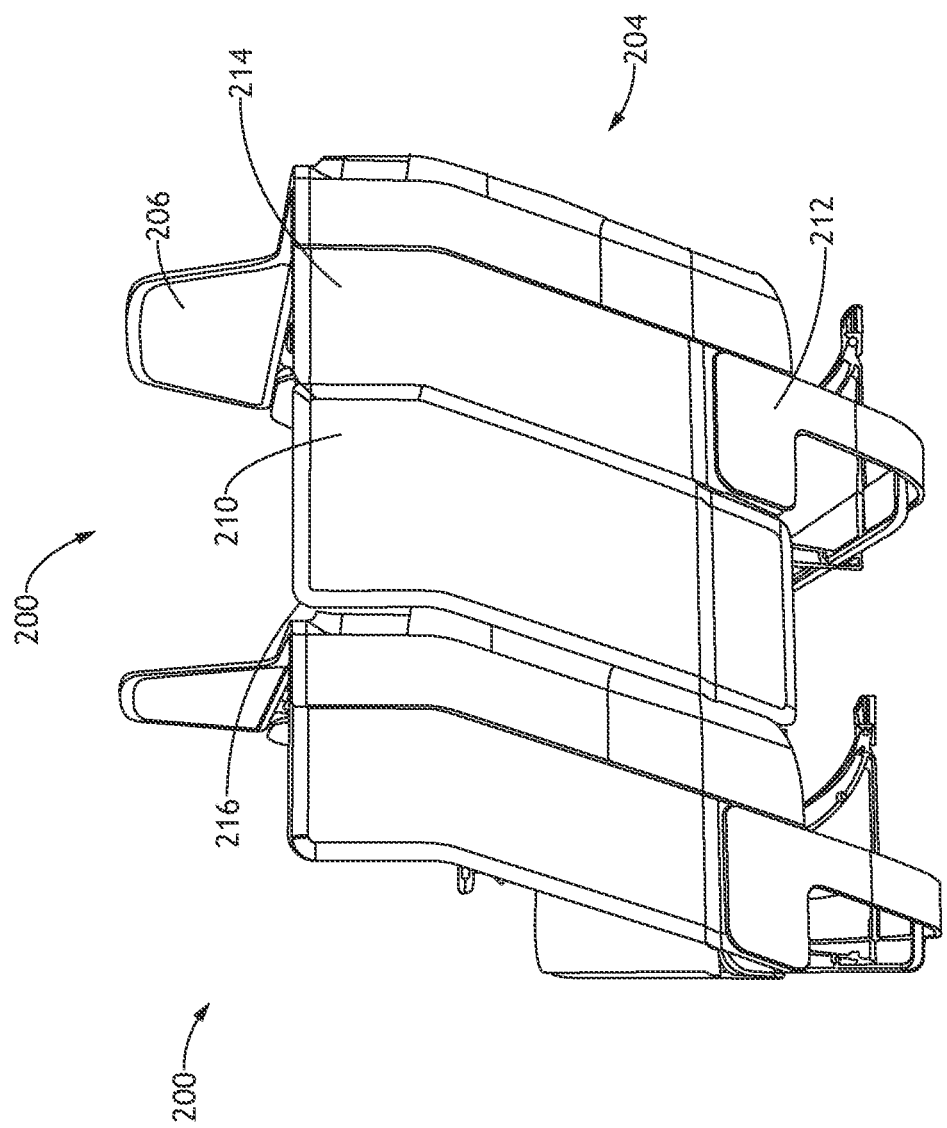
FIG. 2A shows a side view of an aircraft suite according to an exemplary embodiment.
Figure 2B:
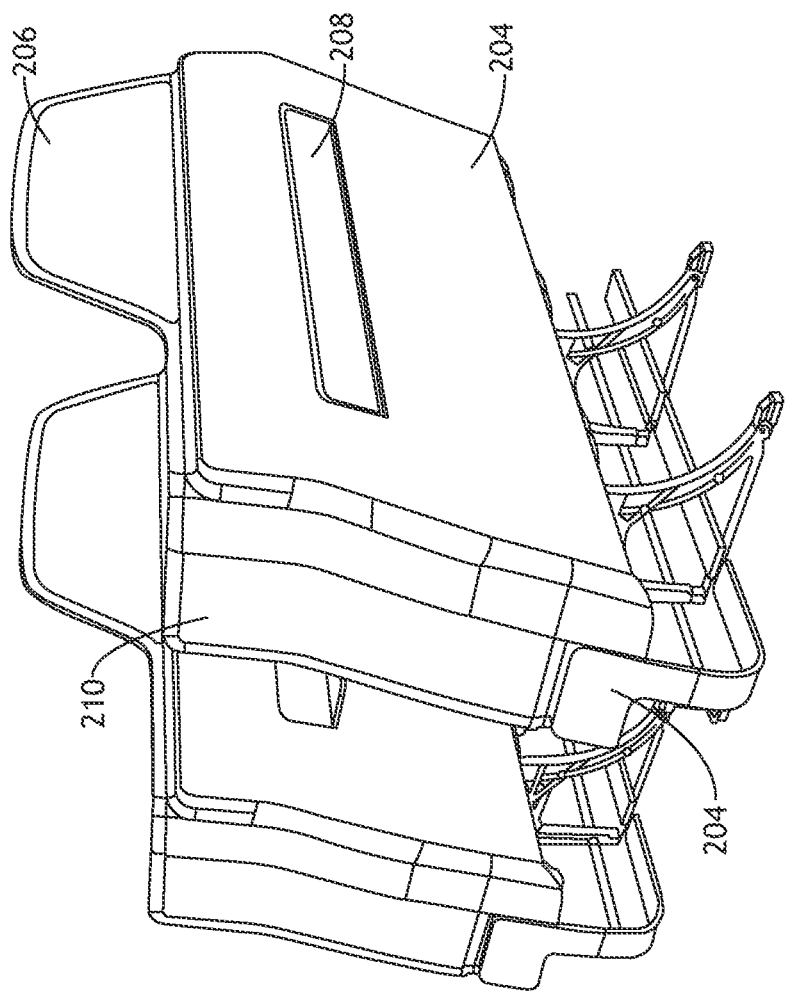
FIG. 2B shows a perspective view of an aircraft suite according to an exemplary embodiment.

Referring to FIGS. 2A-2B, a side view and perspective view of an aircraft suite 200 according to an exemplary embodiment are shown. The aircraft suite 200 comprises a continuous seatback panel 204 affixed or configured to be affixed to each aircraft seat in the suite 200 to cover any gaps between the seats that generally correspond to armrests. The aircraft suite 200 comprises a stowable aisle-side panel 210 that may be in an open configuration, allowing passengers and crew to enter the aircraft suite 200, or a closed configuration, where the interior of the aircraft suite 200 is substantially shielded from view. An anterior edge 216 of the stowable aisle-side panel 210 may generally conform to the shape of the seatback in front of the aircraft suite 200.

The stowable aisle-side panel 210 may be configured to slide upon a track or rail. One or more lateral panels 212, 214 may define the range of motion of the stowable aisle-side panel 210, or otherwise maintain the stowable aisle-side panel 210 in position. An internal lateral panel 214 defines a portion of an enclosing surface when the stowable aisle-side panel 210 is in a closed configuration.

In at least one embodiment, the continuous seatback panel 204 includes an extension portion 206 that extends from a top portion of the continuous seatback panel 204, proximal to an overhead bin or passenger service module when installed. Furthermore, the continuous seatback panel 204 comprises a deployable tray table 208, useable by passengers in the PAX behind the aircraft suite 200. The deployable tray table 208 may be a continuous element that supplants individual tray tables, or separately deployable tray table elements that are configured to interlock when adjacent tray table elements are deployed together.

In at least one embodiment, the continuous seatback panel 204, stowable aisle-side panel 210, and lateral panels 212, 214 are releasably affixed to their corresponding aircraft seats for cleaning, disinfecting, and servicing.

Figure 3A:
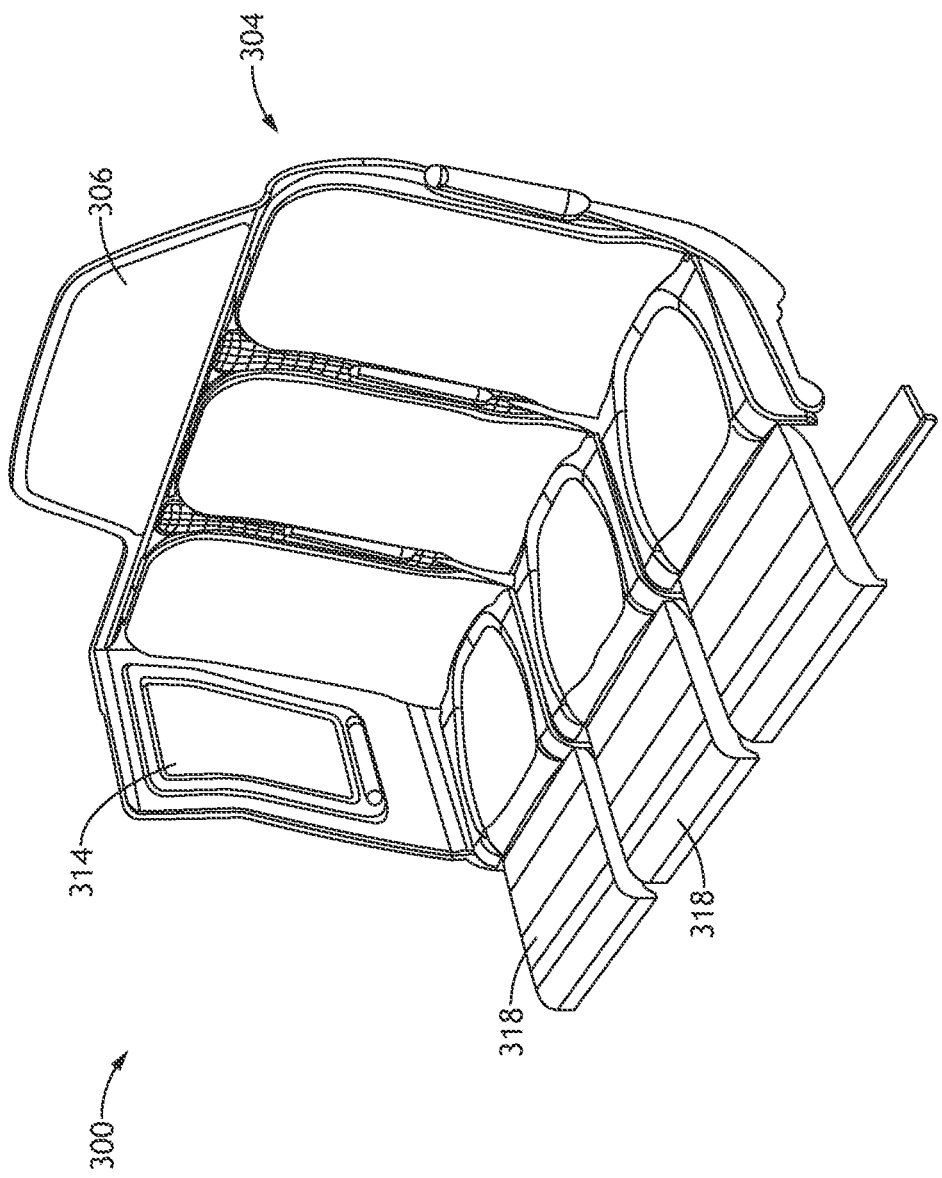
FIG. 3A shows a perspective view of an aircraft suite according to an exemplary embodiment.
Figure 3B:
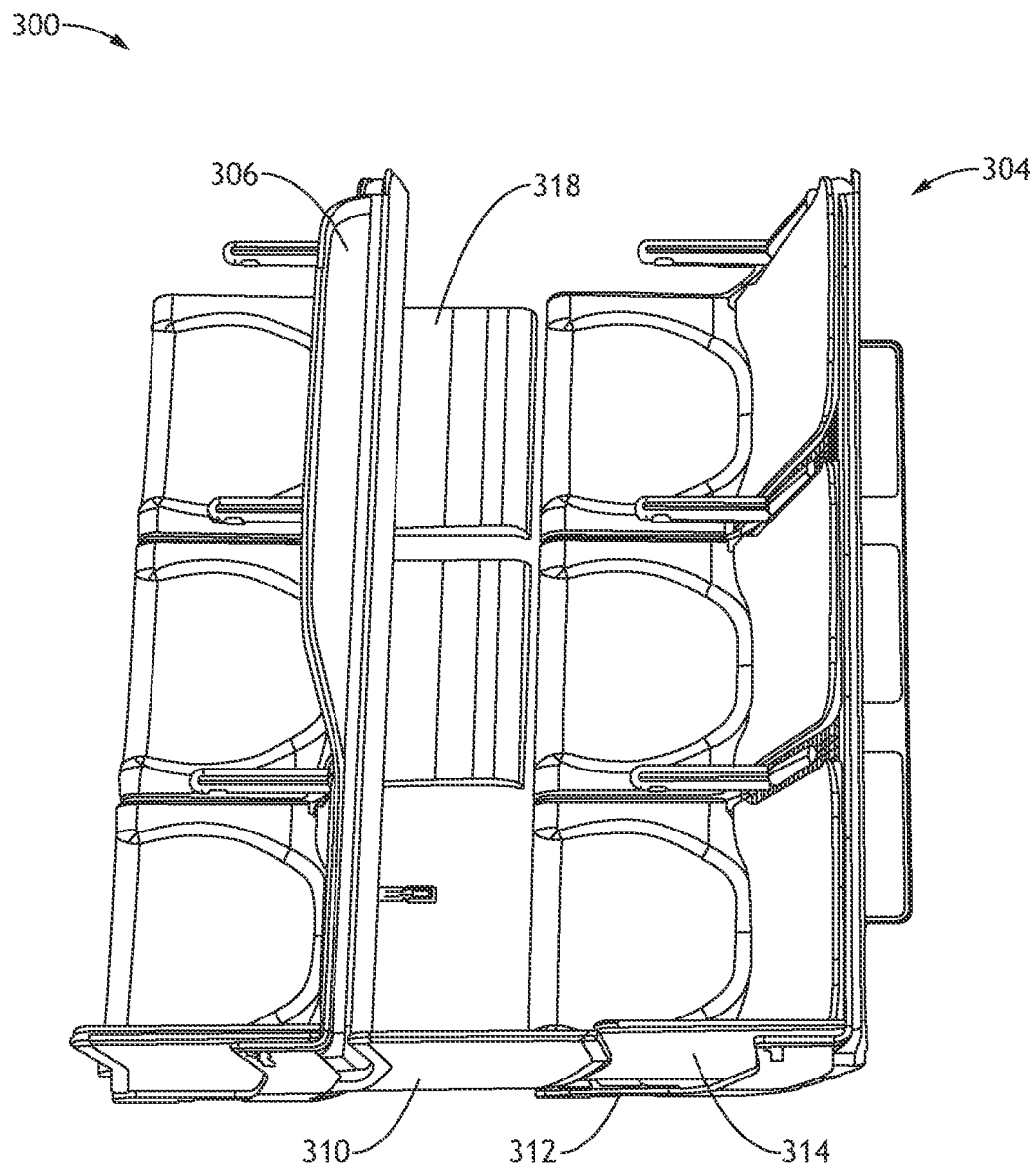
FIG. 3B shows a perspective view of an aircraft suite according to an exemplary embodiment.

Referring to FIGS. 3A-3B, perspective views of an aircraft suite 300 according to an exemplary embodiment are shown. The aircraft suite 300 comprises a continuous seatback panel 304 affixed or configured to be affixed to each aircraft seat in the suite 300 to cover any gaps between the seats that generally correspond to armrests, and an extension portion 306 configured to extend to an overhead bin or passenger service module. The aircraft suite 300 comprises a stowable aisle-side panel 310 that may be in an open configuration or a closed configuration, and lateral panels 312, 314 that define an enclosure.

In at least one embodiment, each aircraft seat in the aircraft suite 300 includes an extension element 318 configured to extend from the aircraft seat cushion. The extension elements 318 and aircraft seat cushions form a half-sitting bed. In at least one embodiment, the extension elements 318 may comprise a sliding element configured to slidably deploy from underneath the corresponding aircraft seat cushion. Alternatively, the extension elements 318 may comprise a rotating element configured to pivotably deploy and lock into a deployed orientation.

Figure 4A:
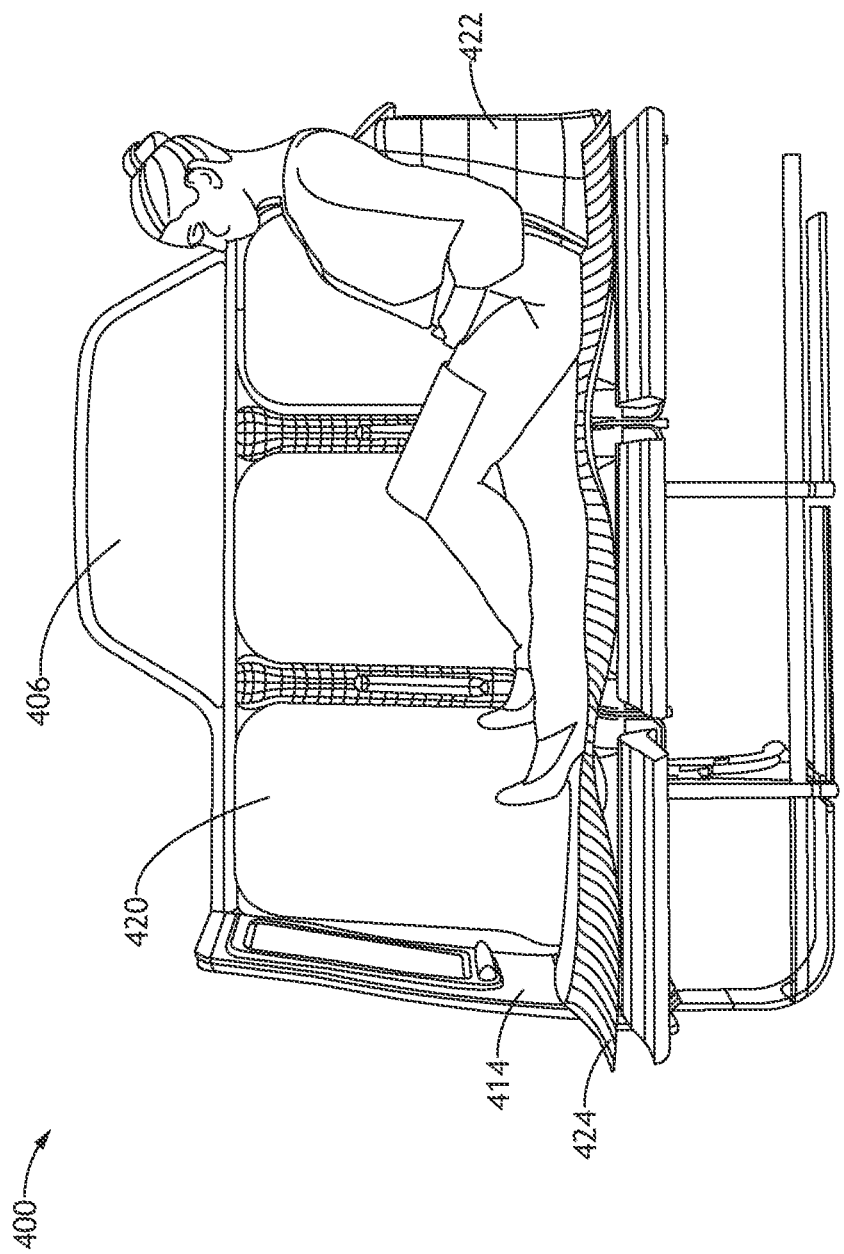
FIG. 4A shows a front view of an aircraft suite according to an exemplary embodiment.
Figure 4B:
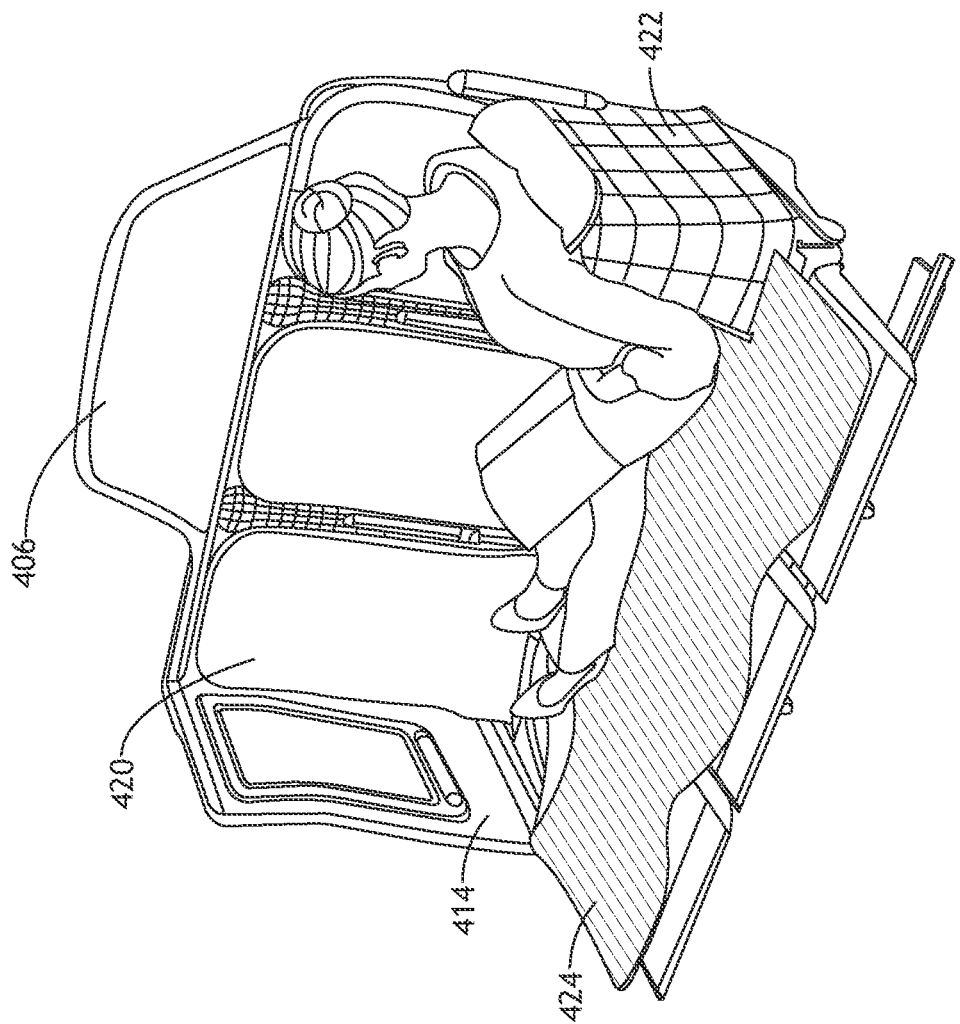
FIG. 4B shows a perspective view of an aircraft suite according to an exemplary embodiment.

Referring to FIGS. 4A-4B, a front view and perspective view of an aircraft suite 400 according to an exemplary embodiment are shown. The aircraft suite 400 comprises a continuous seatback panel affixed or configured to be affixed to each aircraft seat in the suite 400 to cover any gaps between the seats that generally correspond to armrests, and an extension portion 406 configured to extend to an overhead bin or passenger service module. The aircraft suite 400 comprises a stowable aisle-side panel that may be in an open configuration or a closed configuration, and lateral panels 414 that define an enclosure. Each aircraft seat in the aircraft suite 400 includes an extension element configured to extend from the aircraft seat cushion to form a half-sitting bed. In at least one embodiment, a leveling cushion 424 may be unfurled over the extension elements and seat cushions smooth the half-sitting bed surface.

In at least one embodiment, seatback cushions 420 may be reconfigurable. For example, the seatback cushions 420 may be removed from the corresponding seatbacks and reconfigured to form a half-sitting bed pillow or reclining cushion 422. In at least one embodiment, the seatback cushions 420 may include inflatable elements to provide support during reconfiguration.

Figure 5:
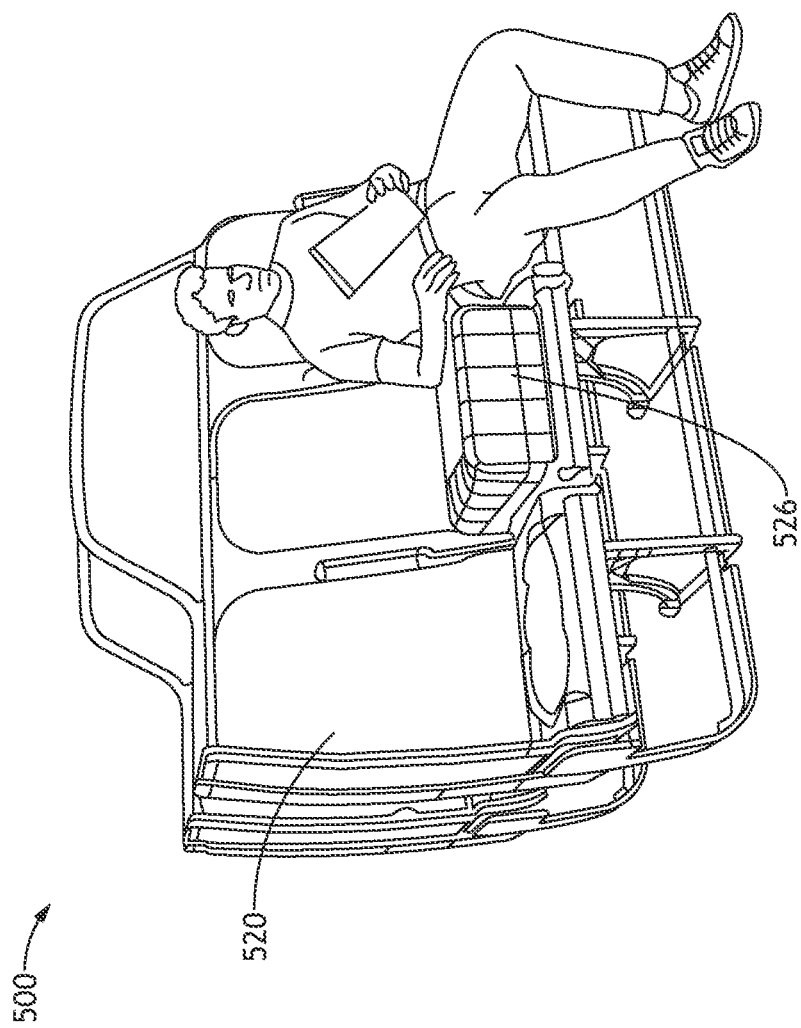
FIG. 5 shows a perspective view of an aircraft suite according to an exemplary embodiment.

Referring to FIG. 5, a perspective view of an aircraft suite 500 according to an exemplary embodiment is shown. At least one reconfigurable seatback cushion 520 may be removed or folded down from the corresponding seatback and reconfigured to form an armrest 526. In at least one embodiment, the seatback cushion 520 may include inflatable elements to provide support during reconfiguration. Furthermore, the seatback cushion 520 may include a solid tray disposed on a posterior surface such that the solid tray is useable when configured as an armrest 526, but abuts a seatback surface when in a seatback cushion 520 configuration.

Figure 6:
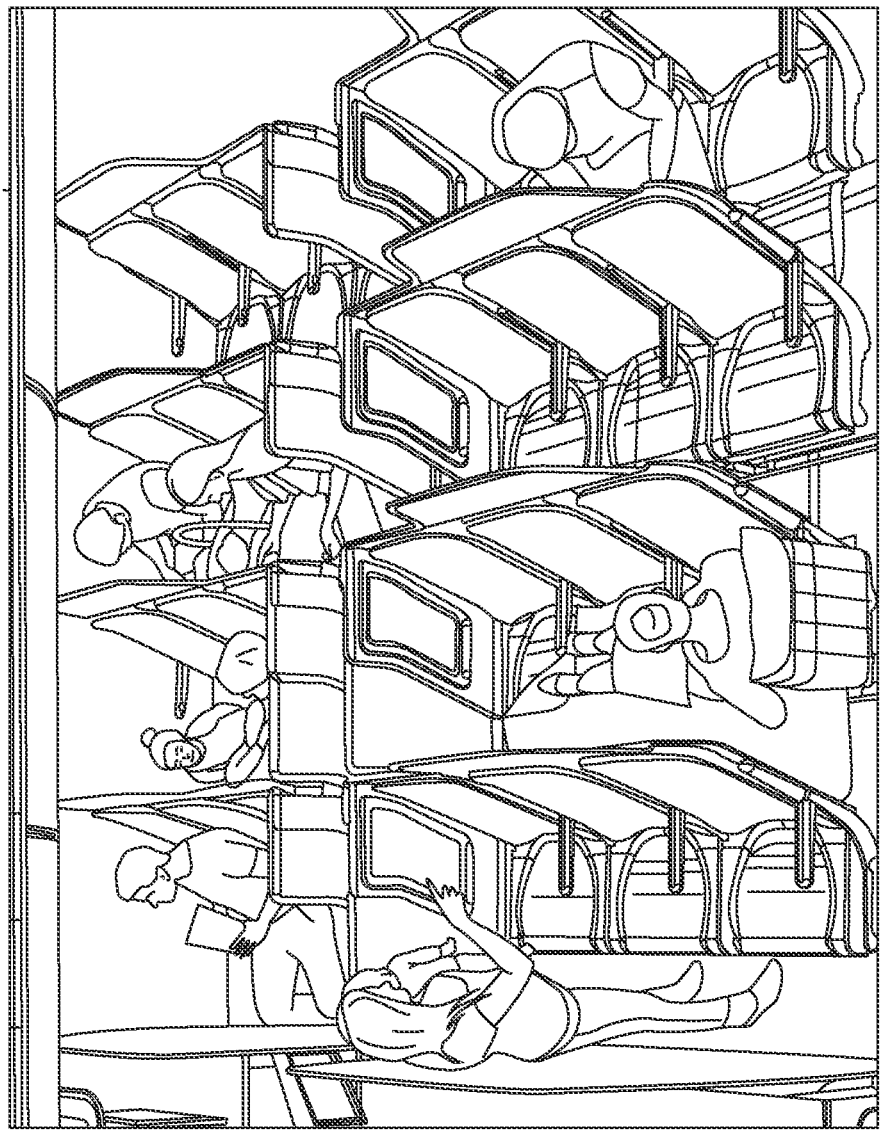
FIG. 6 shows a perspective environmental view of aircraft suites according to an exemplary embodiment.

Referring to FIG. 6, a perspective environmental view of aircraft suites according to an exemplary embodiment is shown. An economy class cabin may include a plurality of aircraft suites according to embodiments described herein.

Embodiments of the present disclosure provide an isolated space for small groups of people, such as families with children/pets or disabled passengers, who do not wish to be disturbed. The semi-closed space creates a peaceful, quiet environment away from other passengers. A standard 3-seat PAX may be converted into a private 1 or 2 person suite based on the flight route or customer demand.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft suite comprising:
a continuous seatback panel;
one or more reconfigurable seatback cushions, at least one of the reconfigurable seatback cushions being removable and reconfigurable into a reclining seatback cushion, and at least one reconfigurable seatback cushion being configured to fold down from the corresponding seatback to form an armrest;
a fixed aisle-side panel; and
a stowable aisle-side panel,
wherein:
the continuous seatback panel is configured to be affixed to a back surface of each aircraft seat in a passenger seating unit (PAX) and comprises a vertical extension configured to protrude upward, proximal to an overhead bin associated with the PAX, the vertical extension comprising:
a frame;
a projector screen disposed within the frame;
a sound muffling material disposed within the frame; and
a plurality of light emitting diodes (LEDs) disposed to illuminate the aircraft suite;
the fixed aisle-side panel is configured to be affixed to an aisle-side aircraft seat and at least partially obscure the PAX from the aisle;
the stowable aisle-side panel is configured to slide from an open configuration, where the PAX is accessible from the aisle, to a closed configuration, where the PAX is obscured from the aisle, the stowable aisle side panel having a forward edge shaped to conform to a rear edge of a continuous seatback panel of a separate aircraft suite when installed; and
the seatback cushion being configured to folded down from the corresponding seatback to form an armrest comprising a solid tray disposed on a posterior surface such that the solid tray is useable when configured as an armrest.

2. The aircraft suite of claim 1, further comprising a seat cushion extension disposed in each of a plurality of seat cushions in the PAX, each seat cushion extension configured to change from a stowed configuration, where the seat cushion extension is stowed beneath the seat cushion, to a deployed configuration, where the seat cushion extension extends to form a substantially flat surface with the corresponding seat cushion.

3. The aircraft suite of claim 1, wherein the continuous seatback panel comprises a deployable tray table disposed on a rear surface.

4. The aircraft suite of claim 3, wherein the deployable tray table comprises a plurality of tray table components, each of the plurality of tray table components configured to deploy separately.

5. The aircraft suite of claim 1, wherein the one or more reconfigurable seatback cushions comprise an inflatable element.

6. An aircraft comprising a plurality of passenger seating units (PAX), each PAX comprising:
one or more reconfigurable seatback cushions, at least one of the reconfigurable seatback cushions being removable and reconfigurable into a reclining seatback cushion, and at least one reconfigurable seatback cushion being configured to fold down from the corresponding seatback to form an armrest, and comprising a solid tray disposed on a posterior surface such that the solid tray is useable when configured as an armrest;
a continuous seatback panel configured to be affixed to a back surface of each aircraft seat in the PAX and comprises a vertical extension configured to protrude upward, proximal to an overhead bin associated with the PAX, the vertical extension comprising:
a frame;
a projection screen disposed within the frame;
a sound muffling material disposed within the frame; and
a plurality of light emitting diodes (LEDs) disposed to illuminate the aircraft suite;

a fixed aisle-side panel configured to be affixed to an aisle side of the PAX; and a stowable aisle-side panel configured to be affixed to the aisle side of the PAX and slide with respect to the fixed aisle-side panel from an open configuration, where the PAX is accessible from an aisle, to a closed configuration, where the PAX is obscured from the aisle, the stowable aisle side panel having a forward edge shaped to conform to a rear edge of a continuous seatback panel of a separate aircraft suite when installed.

7. The aircraft of claim 6, further comprising a plurality of seat cushion extensions, each configured to be affixed to a bottom portion of a corresponding aircraft seat in the PAX, each seat cushion extension configured to change from a stowed configuration, where the seat cushion extension is stowed beneath a seat cushion, to a deployed configuration, where the seat cushion extension is configured to extend and form a substantially flat surface with the corresponding seat cushion.

8. The aircraft of claim 6, wherein the continuous seatback panel comprises a deployable tray table disposed on a rear surface.

9. The aircraft of claim 8, wherein the deployable tray table comprises a plurality of tray table components, each of the plurality of tray table components configured to deploy separately.

* * * * *